United States Patent [19]

Akiyama

[11] 3,750,544
[45] Aug. 7, 1973

[54] EXPOSURE CONTROL DEVICE FOR CAMERA

[75] Inventor: Hideaki Akiyama, Tokyo, Japan

[73] Assignee: Kabushiki Kaisha Ricoh, Tokyo, Japan

[22] Filed: Oct. 22, 1971

[21] Appl. No.: 191,934

[30] Foreign Application Priority Data
Oct. 27, 1970  Japan ..... 45/106076 (utility model)
Oct. 27, 1970  Japan ..... 45/106077 (utility model)

[52] U.S. Cl. .............................................. 95/10 C
[51] Int. Cl. ............................................. G03b 7/04
[58] Field of Search ..................................... 95/10 C

[56] References Cited
UNITED STATES PATENTS

| | | | |
|---|---|---|---|
| 3,078,772 | 2/1963 | Goshima............................... | 95/10 |
| 3,503,313 | 3/1970 | Kuramoto.............................. | 95/10 |
| 3,643,564 | 2/1972 | Uchiyama.............................. | 95/10 |
| 3,073,226 | 1/1963 | Greger et al.......................... | 95/10 |
| 3,057,276 | 10/1962 | Flach et al............................. | 95/10 |

Primary Examiner—Samuel S. Matthews
Assistant Examiner—Michael L. Gellner
Attorney—Milton J. Wayne et al.

[57] ABSTRACT

The leading portion beyond the leading arcuate edge of a base plate for an exposure meter or exposure control meter is so bent that the leading end of the pointer may extend upwardly through an arcuate slot formed in the base plate from the undersurface thereof. The detecting arm of a detecting lever slides on the base plate in response to the shutter release operation toward the leading end of the pointer and engages therewith when the brightness of a subject is sufficient for EE photography. Thereafter a pointer retaining plate presses the pointer against the base plate, and depending upon the position of the pointer or the retaining plate, the exposure conditions are determined. When the brightness of a subject is not sufficient for EE photography, the leading end of the pointer is moved away from the path of the detecting arm so that the latter is displaced a greater stroke without being interrupted by the leading end of the pointer, and actuates a switch or switches in an electric circuit to select a slow shutter speed or set both of the shutter and flash cube triggering circuits ready for flash photography.

14 Claims, 6 Drawing Figures

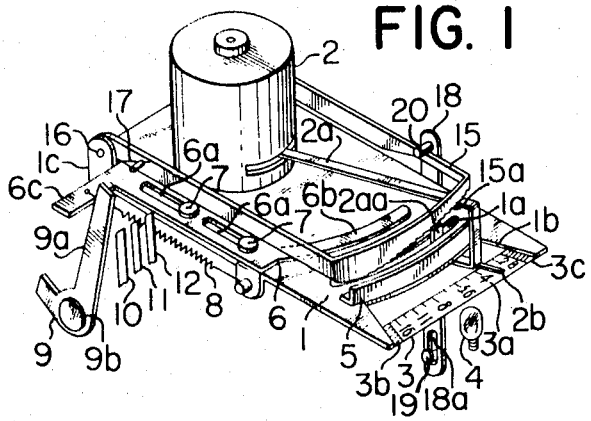
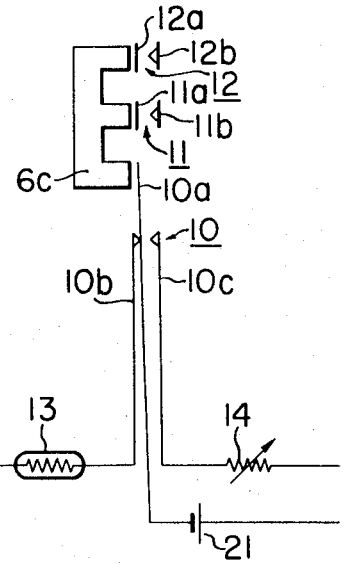
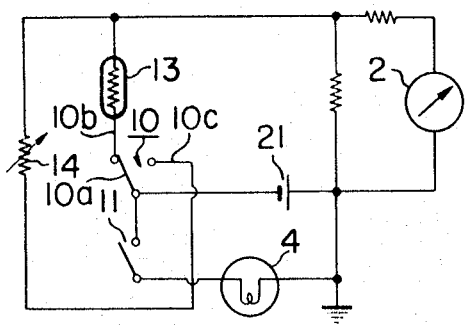
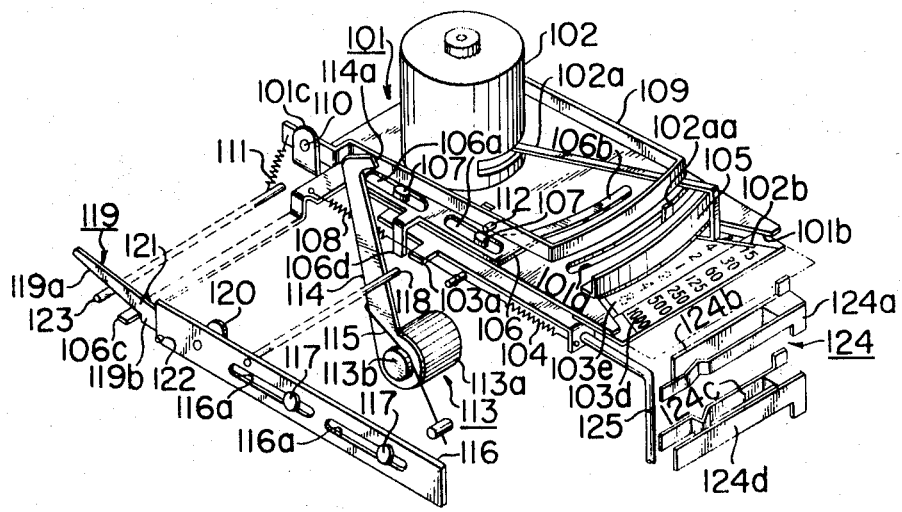

EXPOSURE CONTROL DEVICE FOR CAMERA

BACKGROUND OF THE INVENTION

The present invention relates to an exposure control device and more particularly an exposure control device for use in an electric eye or EE exposure control system.

In an EE camera of the type in which either of the stop or shutter speed or both of them are automatically set in response to the angular displacement of a pointer of an exposure meter, there has been known a flash selection device in which a pointer retaining plate is provided in order to detect whether the pointer swings into the EE range or not so that only when the brightness of a subject is within the EE range, the pointer retaining plate closes a power source switch in response to the shutter release operation, thereby triggering a flash cube or the like. In the cameras of the type incorporating such flash selection device, it is required to set a stop depending upon a guide number of a flash cube to be used and a film-to-subject distance but independently of the angular displacement of the pointer of the exposure meter when a flash photography is made. Therefore, there must be provided a complex clutch device which actuates a stop or aperture setting device depending upon an EE or flash photography, and the energy for driving this clutch device must be generated in the course of the shutter release operation. Therefore, there is a disadvantage in that both of the shutter button release stroke and shutter releasing force must be increased.

There has been also well known in the art an electronic shutter in which the variation in resistance of a photoelectric element depending upon the brightness of a subject is not directly introduced into an electronic time constant circuit, but a pointer of an exposure control meter is swung into contact with one of a plurality of stationary resistor contacts disposed below the path of the pointer so as to close the electronic time constant circuit through the pointer and the exposure control meter so that a shutter speed depending upon the value of the resistor that is contacted by the pointer may be obtained. In this electronic shutter, the exposure control meter is also used to indicate the over or under exposure. However, it is almost impossible to array a plurality of contacts corresponding to the shutter speeds from a few seconds to one one-thousandth second within a limited range through which the pointer swings, and it is also very difficult to read a shutter speed indicated by the pointer. Therefore, in the prior art electronic shutters, the low shutter speeds are not used, but only the shutter speeds higher than one-fifteenth or one-thirtieth second are used so that the advantages of the electronic shutters are not utilized to the full extent.

SUMMARY OF THE INVENTION

One of the objects of the present invention is, therefore, to overcome the defects encountered in the prior art exposure control devices for EE cameras.

Another object of the present invention is to provide an exposure control device for use in EE cameras which is capable of selecting either of an EE control circuit or flash cube triggering circuit in an advantageous manner.

A still another object of the present invention is to provide an exposure control device for EE cameras which is capable of controlling both of high and low shutter speeds by one exposure control meter.

According to the present invention, the leading portion of a pointer of an exposure meter or exposure control meter extending beyond a meter mounting base plate is so bent that the leading end of the pointer may extend upwardly through an arcuate slot of the base plate from the undersurface thereof while the main pointer portion swings above the base plate. In response to the shutter release operation, a detecting arm of a detecting lever is displaced on the base plate toward the extreme end of the pointer, and engages therewith when the brightness of a subject is within the EE range. Thereafter, a pointer retaining plate presses down the pointer against the base plate, and the exposure conditions are determined depending upon the position of the pointer or the retaining plate. When the brightness of a subject is out of the EE range, the leading end of the pointer is so arranged as to move away from the path of the detecting arm so that the detecting lever may be displaced further, and actuates a switch or switches in an electric circuit to change a shutter mechanism to a low shutter speed range or operation or to set both of the shutter mechanism and a trigger circuit ready for flash photography.

The above and other objects, features and advantages of the present invention will become more apparent from the description of the preferred embodiments thereof taken in conjunction with the accompanying drawings.

BRIEF DESCRIPTION OF THE DRAWINGS

FIG. 1 is a perspective view of a first embodiment of an exposure control device in accordance with the present invention;

FIG. 2 is a circuit diagram for explanation of the mode of operation of switches of the present invention;

FIG. 3 is a circuit diagram of the electrical elements shown in FIG. 4;

FIG. 4 is a perspective view of a second embodiment of the present invention.

DESCRIPTION OF THE PREFERRED EMBODIMENTS

Figure 5:
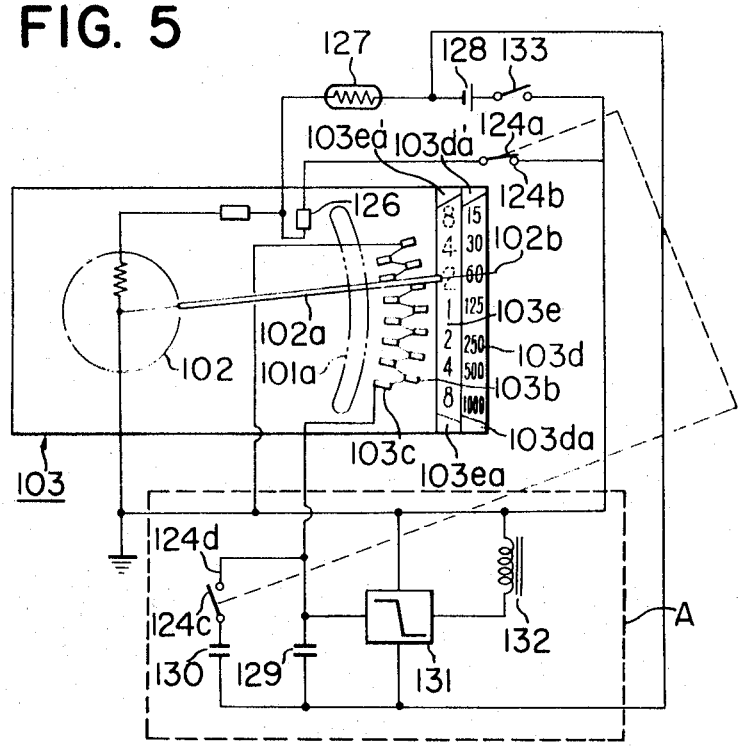
FIGS. 5 and 6 are circuit diagrams of the electrical elements shown in FIG. 4.

The present invention will be described as being applied to an EE camera having a built-in flash cube. First referring to FIG. 1, an exposure meter mounting base plate 1 is provided with an arcuate slot 1a, a wide notch 1b and a pair of upright bearing members 1c integral with the base plate 1. An exposure meter 2 is mounted on the base plate 1, and its pointer 2a is bent in the form of U as shown in FIG. 1 so that the leading end 2aa of the pointer 2a may extend upwardly through the arcuate slot 1a of the base plate 1. A stop indicating pointer 2b extends from the base of the U-shaped portion of the pointer 2a so that stop scales 3a and over- and under-exposure ranges 3b and 3c graduated on a transparent or opaque stop scale plate 3 may be indicated by the stop indicating pointer 2b. The stop scales 3a and the over- and under-exposure ranges 3b and 3c on the stop scale plate 3 which is disposed in the notch 1b of the base plate 1 are so arranged so as to be viewed in the field of view of a viewfinder or through a window of the camera body (not shown). A warning lamp 4 is provided to illuminate the stop scale plate 3 from its upper or lower surface. An upright pointer stop plate 5 is fixed on the base plate 1, and a detecting lever 6 whose longitudinally elongated slots 6a are fitted over pins 7 extending from the base plate 1, is normally biased to move to the right in FIG. 1 under the force of a spring 8 loaded between the detecting lever 6 and the base plate 1. The detecting lever 6 is provided with a detecting arm 6b and a projection 6c. A bell crank lever 9 is pivoted to a stationary member (not shown) with a pin 9b in such a manner that one arm 9a of the bell crank lever 9 may engage with the projection 6c of the detecting lever 6 so as to prevent the movement of the detecting lever 6 to the right in FIG. 1 against the spring 8 in cooperation with a release member (not shown) which is actuated by a mechanism (not shown). That is, upon depression of a shutter release button (not shown), the projection 6c of the detecting lever 6 is disengaged from the one arm 9a of the bell crank lever 9 so that the movement of the detecting lever 6 toward the right may be permitted. When the brightness of a subject is within a predetermined EE range, the detecting arm 6b presses, under the force of the spring 8, the leading end 2aa of the pointer 2a against the edge of the arcuate slot 1a of the base plate 1 so that the angular movement of the pointer 2a is limited. However, when the brightness of a subject is not within the EE range but in the underexposure range 3c, the arm 6b will not engage with the leading end 2aa of the pointer so that the detecting lever 6 may displace its full stroke to the right. Switches 10, 11 and 12 are disposed in the range of the stroke of the projection 6c of the detecting arm 6 so that these switches may be closed by the projection 6c depending upon the stroke thereof. As shown in FIG. 2, these switches 10, 11 and 12 comprises movable contacts 10a, 11a and 12a and fixed contacts 10b, 10c, 11b and 12b. The switch 10 is operable to select a photoelectric element 13 or a variable resistor 14. The resistance of the variable resistor 14 may vary in response to a guide member of the built-in flash cube and a film-to-subject distance.

Referring back to FIG. 1, a cam plate 15 is carried by a shaft 16 supported by the bearing members 1c of the base plate 1, and is caused to rotate in the clockwise direction under the force of a spring 17 in response to the actuation of the shutter release mechanism (not shown).

The cam plate 15 is provided with a stepped cam surface 15a which engages with the pointer 2a so that the vertical displacement of the cam plate 15 is dependent upon the angular displacement of the pointer 2a. It should be noted that when the cam plate 15 engages with the pointer 2a, the leading end 2aa of the pointer 2a is moved downwardly away from the plane in which the detecting arm 6b moves. A pin 19 extending from the stationary member (not shown) is fitted into an elongated slot 18a of a connecting lever 18 so that the lever 18 may move vertically. The lever 18 is loaded with a spring (not shown) so that it may be normally biased to move downwardly. A pin 20 extending from the upper end of the connecting lever 18 is adapted to engage with the upper edge of a side of the cam plate 15 adjacent to the cam surface 15a so that the displacement of the connecting lever 18 may be in proportion to the vertical displacement of the cam plate 15 described above.

The exposure meter 2, the switches 10 and 11, the variable resistor 14 and the warning lamp 4 are electrically connected as shown in FIG. 3. The switch 12 is connected to a trigger circuit of the flash cube (not shown) through the x contact of the camera. In the circuit diagrams shown in FIGS. 2 and 3, reference numeral 21 indicates a dc power source.

Next the mode of operation will be described. When the brightness of a subject is within the EE range, the pointer 2b indicates an optimum stop, and the movement of the detecting lever 6 is limited by the leading end 2aa of the pointer 2a. Upon depression of the shutter release button (not shown), the bell crank lever 9 is caused to rotate in the clockwise direction to release the detecting lever 6. Therefore, the lever 6 displaces a little distance to the right in FIG. 1 to engage with the pointer 2a. Slightly after the engagement of the detecting lever 6 with the pointer 2a, the cam plate 15 presses down the pointer 2a against the pointer stop plate 5 so that the angular displacement of the cam plate 15 is limited. The connecting lever 18 is displaced in proportion to the displacement of the cam plate 15 so that the diaphragm (not shown) is opened from its minimum stop to the optimum stop in response to the angular displacement of the pointer 2a. When the shutter release button is further depressed, the shutter release mechanism (not shown) is actuated to permit the ordinary EE exposure.

When the brightness of a subject is too dark to actuate the EE mechanism, the pointer 2b swings into the under-exposure range 3c on the stop scale plate 3, and the arm 6b of the detecting lever 6 may displace its full stroke to the right in FIG. 1 beyond the path of the leading end 2aa of the pointer 2a in response to the shutter release operation because the leading end 2aa is moved away from the path of the arm 6b in the manner as described above. During the displacement of the detecting lever 6, the projection 6c engages with the movable contacts 10a, 11a and 12a of the switches 10, 11 and 12. As a consequence, the photoelectric element 13 is switched to the variable resistor 14; the switch 11 is closed to turn on the warning lamp 4; and the switch 12 is closed to make the flash-cube trigger circuit (not shown) ready to trigger or fire. Therefore, the current which has passed through the variable resistor 14 whose resistance is varied depending upon the guide-number of the flash cube and the film-to-subject distance, passes through the exposure meter 2 so that the angular displacement of the pointer 2a is determined depending upon the value of the variable resistor 14. Next the cam plate 15 is caused to rotate in the clockwise direction, and the cam surface 15a of the cam plate 15 engages with the pointer 2a to press it against the pointer stop plate 5. Therefore, the angular displacement of the cam plate 15 is determined, and the connecting lever 18 whose displacement is in proportion to the displacement of the cam plate 15 actuates the diaphragm (not shown) to set the optimum stop. When the shutter release button is further depressed, the shutter release mechanism (not shown) is actuated to trigger the flash cube, thus permitting the flash photography.

Therefore, it is seen that when the value of the variable resistor 14 is suitably selected, the optimum stop for a given lens-to-subject distance can be obtained. In this case the selected stop may be clearly viewed in the viewfinder as the warning lamp 4 illuminates the stop indicating pointer 2b and the stop scale plate 3. That is, when the film-to-subject distance is too close or too far, the pointer 2b indicates the under- or over-exposure range 3c or 3b.

When the shutter release button is released after the shutter mechanism has been actuated, the bell crank lever 9 is caused to rotate in the counterclockwise direction so that the one arm 9a engages with the projection 6c of the detecting lever 6 to move it toward the left in FIG. 1 against the spring 8. In this case, as described above, the leading end 2aa of the pointer 2a is moved away from the path of the detecting arm 6b because the pointer 2a is still pressed down by the cam plate 15 so that the detecting arm 6b may be free to move to the left beyond the path of the leading end 2aa of the pointer 2a. The movable contact 10a of the switch 10 makes contact with the stationary contact 10b to energize the photoelectric element 13 and to de-energize the variable resistor 14, and the switches 11 and 12 are opened to turn off the warning lamp 4 and to de-energize the trigger circuit (not shown). Thereafter the cam plate 15 is returned in the counterclockwise direction to its normal position together with the connecting lever 18 so that the pointer 2a is released to return to the minimum stop position. As a mechanism for returning the cam plate in the counterclockwise direction to its normal position after the detecting lever 6 has been returned to its normal position is apparent to those skilled in the art, it is not shown in the drawings.

According to the first embodiment of the present invention described above, when the brightness of a subject is within the EE range, EE photography is made without triggering the flash cube, but when the brightness is too dark to actuate the EE mechanism, an optimum stop is automatically selected depending upon a guide-number of the flash cube and a given film-to-subject distance, and then the flash cube is also automatically fired to permit the flash photography. Therefore it is seen that the present invention permits the EE camera to take a picture of any subject at any time without any special operation. Since the warning lamp is provided, the selected stop may be clearly viewed in the viewfinder or through the window of the camera, and when the film-to-subject distance is not correct so that the under- or over-exposure is present, the pointer of the exposure meter swings into the under- or over-exposure region, thereby giving the warning. Furthermore, the exposure control device is simple in construction and compact in size without requiring a complex clutch mechanism, and inexpensive to manufacture. Moreover, the operation is reliable and dependable since the control device may be so designed that it is not required to increase the shutter release stroke and force.

Next the second embodiment of the present invention will be described hereinafter with reference to FIGS. 4-6. In FIG.4 a base plate 101 for an exposure meter is provided with an arcuate slot 101a, a wide notch 101b and a pair of upright bearing members 101c formed integral with the base plate. An exposure meter 102 mounted upon the base plate 101 is so arranged as to be rotated to a suitable position depending upon the speed of a film to be used, and the leading end portion of a pointer 102a is formed in the shape of a U as best shown in FIG. 4 in such a manner that the leading end 102aa may extend upwardly through the arcuate slot 101a of the base plate 101. A shutter-speed indicating pointer 102b extends from the base of the U-shaped portion of the pointer 102a onto a scale plate 103 which is disposed under the base plate 101 and is normally biased to move to the left in FIG. 4 under the force of a spring 104 loaded between the scale plate 103 and the base plate 101. The scale plate 103 is provided with a projection 103a, and two shutter-speed scales 103d and 103e. The high-shutter-speed scale 103d is graduated from one one-thousandth to one-fifteenth second while the low-shutter-speed scale 103e is graduated from one-eighth to 8 seconds. Contacts of resistors in a time-constant circuit are staggered in the scale plate 103 as indicated by 103b and 103c in FIG. 5, each of these contacts corresponding to each of the shutter speeds from one one-thousandth to 8 seconds. When the shutter-speed scale plate 103 is moved to the left, the high shutter speed scale 103d is in opposed relation with the indicating pointer 102b while the high shutter speed contacts 103b are in opposed relation with the pointer 102a. When the shutter speed scale plate 103 is moved to the right, the low shutter speed scale 103e is in opposed relation with the shutter speed indicating pointer 102b while the low shutter speed contacts 103c are in opposed relation with the rear face of the leading end of the pointer 102a. A movable contact (not shown) is fixed to the rear face of the leading end of the pointer 102a.

The high- and low-shutter-speed contacts 103b and 103c are connected through the resistors to an output circuit A in FIG. 5. On both ends of the high- and low-shutter-speed scales 103d and 103e are marked under- and over-exposure regions 103da and 103ea and 103da' and 103ea' respectively.

Referring back to FIG. 4, a pointer stop plate 105 is disposed uprightly on the base plate 101, and a detecting lever 106 has its elongated slots 106a disposed around pins 107 extending from the base plate 101 so as to move on its longitudinally, and is biased to move to the right under the force of a spring 108 loaded between the lever 106 and a stationary member (not shown). The spring 108 is stronger than the spring 104. The detecting lever 106 is provided with a detecting arm 106b and projections 106c and 106d. The detecting arm 106b extends into the path of the leading end 102aa of the pointer 102 for engagement therewith, and the projection 106d extends into the path of the projection 103a of the shutter speed scale plate 103. A pointer retaining plate 109 carried by a shaft 110 supported by the bearing members 101c of the base plate 101 is biased to rotate in the counterclockwise direction under the force of a spring 111 loaded between the retaining plate 109 and the stationary pin 123, and is provided with pins 112 extending from both of the side edges thereof respectively. When the retaining plate 109 is rotated in the clockwise direction, its arcuate edge presses the pointer 102a against the pointer stop plate 105 to move downwardly the end 102aa of the pointer 102a away from the plate in which the detecting arm 106b moves. A governor 113 is disposed in such a manner that its casing 113a is securely fixed to the stationary member (not shown) and that its shaft 113b is coupled to an oil damper or one-way clutch so that the clockwise rotation may be somewhat retarded while the counterclockwise rotation is free. That is, the shaft 113b rotates at low speed in the clockwise direction but at high speed in the counterclockwise direction. A lever 114 is carried by the shaft 113b of the governor 113 and is biased to rotate in the counterclockwise direction under the force of a spring 115 loaded between the lever 114 and the stationary member. When the lever 114 rotates in the counterclockwise direction, it engages with the projection 106c of the detecting lever 106, and when it rotates in the clockwise direction its pawl 114a at the upper end of the lever 114 contacts the pin 112 of the pointer retaining plate 109 to cause it to rotate in the clockwise direction against the spring 111. It should be noted that in operation the pointer retaining plate 109 is rotated in the counterclockwise direction when the lever 114 is in the position shown in FIG. 4 so that the pin 112 may engage with the pawl 114a, but the retaining plate 109 is shown as being rotated in the clockwise direction in order to show clearly the engagement of the pointer 102a with the retaining plate 109. The elongated slots 116a of an interlocking lever 116 are fitted over pins 117 extending from the stationary member (not shown) so that the lever 116 may slide over the stationary member. The interlocking lever 116 is moved to the right in response to the shutter release operation so that its pin 118, which extends horizontally, engages with the intermediate lever 114 to cause it to rotate in the counterclockwise direction against the spring 115. A locking lever 119 which is pivoted to the interlocking lever 116 with a pin 120 is biased to rotate in the counterclockwise direction under the force of a spring 121, and is stopped by a stopper 122. The sloping surface 119a of the locking lever 119 engages with a stationary pin 123, and the stepped portion 119b engages with the projection 106c of the detecting lever 106. A switch 124 comprises a pair of movable contacts 124a and 124c and a pair of stationary contacts 124b and 124d, and is adapted to be opened and closed by a pin 125 extending from the scale plate 103 when the latter is displaced its full stroke.

Figure 6:
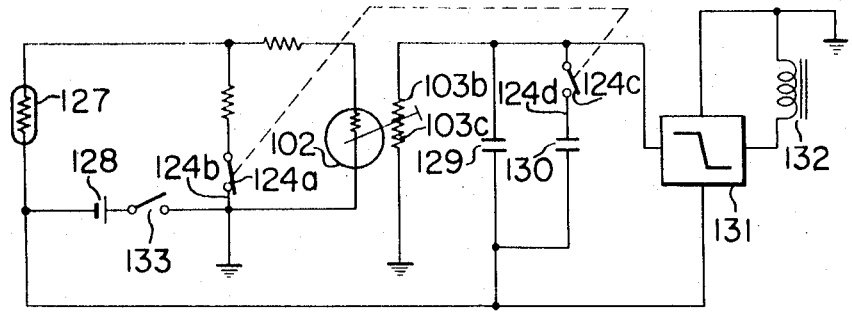

Next referring to FIGS. 5 and 6 illustrating the electronic circuits of the second embodiment of the present invention, reference numeral 126 designates a resistor for switching the ranges of a time constant circuit; 127, a photoelectric element for exposure control; and 128, a power source. The resistor 126 is normally connected in parallel with the resistors 103c and is disconnected therefrom when the movable contact 124a is disconnected from the stationary contact 124b in response to the full stroke displacement of the shutter-speed scale plate 103 so that the magnitude of the current flowing through the exposure meter 102 is changed. Reference numeral 129 designates a capacitor for high shutter speed; 130, a capacitor for low shutter speed; 131, a switching circuit for controlling a magnet 132 for actuating the shutter; and 133, a power switch.

Next the mode of operation will be described. First depending upon the photosensitivity of the film to be used, the exposure meter 102 is rotated to a predetermined operative position. When the shutter release button (not shown) is depressed, the interlocking lever 116 is caused to move to the right so that the lever 114 is released from the pin 118. As a consequence, the lever 114 is rotated in the clockwise direction under the force of the spring 115 at a speed which is controlled by the governor 113 in the manner described above. Upon rotation of the lever 114, the detecting lever 106 is released to move toward the right under the force of the spring 108. When the brightness of a subject is sufficient so that an optimum shutter speed is in the high shutter speed range from one one-thousandth to one-fifteenth, the end 102aa of the pointer 102 is in the path of the detecting arm 106a of the detecting lever 106 so that the end 102aa is pressed against the side edge of the arcuate slot 101a by the detecting arm 106a. However, the projection 106d of the detecting lever 106 is disengaged from the projection 103a of the scale plate 103 so that the latter is held in the left position under the force of the spring 104. As a result, the high-shutter-speed scale 103d is viewed in the field of view of the viewfinder, and the indicating pointer 102b indicates an optimum shutter speed. The contacts 124a and 124b are closed while the contacts 124c annd 124d are kept opened.

Immediately, after the pointer 102a is locked, the pawl 114a of the lever 114 presses the pin 112 of the pointer retaining plate 109 to cause it to rotate in the clockwise direction against the spring 111 so that the arcuate edge of the retaining plate 109 presses the pointer 102a against the pointer stop plate 105. As a consequence, the movable contact (not shown) of the pointer 102a moves into contact with one of the resistor contacts 103b which is located immediately below the pointer 102a so that a time-constant circuit is established. When the shutter release button (not shown) is further depressed, the shutter mechanism (not shown) is actuated at a high shutter speed which is determined by the time-constant circuit.

When the brightness of a subject is relatively dark so that an optimum shutter speed is between one-eighth and 8 seconds, the end 102aa of the pointer 102a is moved away from the path of the detecting arm 106a of the detecting lever 106 so that the projection 106d together with the projection 103a may move toward the right against the spring 104 beyond the path of the end 102aa of the pointer 102a. Simultaneously, the pin 125 of the scale plate 103 pushes the movable contacts 124a and 124c of the switch 124 to move the movable contact 124a away from the stationary contact 124b and to move the contact 124c into contact with the stationary contact 124d. Therefore the exposure meter 102 is switched to operate with low sensitivity so that the pointer 102a swings again. Therefore the low shutter-speed-scale 103e is viewed in the viewfinder, and an optimum shutter speed is indicated by the pointer 102b. Thereafter the lever 114 causes the retaining plate 106 to rotate in the clockwise direction to press the pointer 102a. Therefore, the end of the pointer 102aa is moved away from the path of the arm 106b of the detecting lever 106, and the pointer 102a moves into contact with one of the low-shutter-speed contacts 103c, thereby establishing the low shutter speed time-constant circuit. Thereafter, when the shutter release button is further depressed, the shutter mechanism is actuated for exposure at a lower shutter speed.

When the shutter release button (not shown) is released after the shutter has been actuated, the interlocking lever 116 is caused to move toward the left under the force of a spring (not shown) so that the projection 106c of the detecting lever 106 is pushed by the stepped portion 119b of the locking lever 119 to move the lever 106 toward the left against the spring 108. In this case the pointer retaining plate 109 presses the pointer 102a so that the end 102aa of the pointer is moved away from the path of the arm 106a of the detecting lever 106. Therefore, the movement of the lever 106 toward the left is not interrupted at all. After the detecting lever 106 is moved toward the left beyond the arcuate slot 101a of the base plate 101, the pin 118 of the interlocking lever 116 pushes the lever 114 to cause it to rotate in the counterclockwise direction against the spring 115 to release the pointer retaining plate 109. Therefore, the plate 109 is caused to rotate in the counterclockwise direction under the force of the spring 111 to release the pointer 102a away from the resistor contact 103c. The scale plate 103 is returned to its normal position together with the detecting lever 106 under the force of the spring 4. When the interlocking lever 116 reaches its left end of the stroke, the pin 123 engages with the sloping surface 119a of the locking lever 119 so that the lever 119 is caused to rotate in the clockwise direction against the spring 121, and the stepped portion 119b is released from the projection 106c of the detecting lever 106. At the end of the counterclockwise rotation of the lever 114, it pushes the projection 106c to return the detecting lever 106 to its normal position at the left end.

As described in detail with reference to the second embodiment of the present invention, in a camera incorporating an electronic shutter in which the resistance of a time-constant circuit is changed depending upon the angular displacement of the pointer of an exposure control meter, the present invention provides the detecting lever which makes a smaller or greater displacement depending upon whether it engages or not with the leading end of the pointer, the scale plate having the high and low shutter speed scales and the groups of resistors in the time constant circuit, the switch for shifting the range of the time-constant circuit in response to the displacement of the scale plate, and the pointer retaining plate for pressing the pointer into contact with one of the resistors in the time constant circuit. When upon depression of the shutter release button an optimum shutter speed is in the high shutter speed range, the pointer engages with the detecting lever to limit its displacement, and the scale plate is not moved so that the high shutter speed scale is viewed in the viewfinder. Furthermore, when the retaining plate presses the pointer, the latter moves into contact with one of the high shutter speed resistor contacts which is immediately below the pointer so that the high shutter speed time constant circuit is established in the electronic shutter. When an optimum shutter speed is in the low shutter speed range, the pointer is moved away from the path of the detecting lever so that the latter may move beyond the path of the end of the pointer. Therefore, the pointer is permitted again to swing. The detecting lever displaces the scale plate so that the low shutter speed scale is viewed in the viewfinder, and the scale plate actuates said switch to actuate the exposure control meter with the high sensitivity. The retaining plate causes the pointer to move into contact with one of the low shutter speed resistor contacts so that the low shutter speed time-constant circuit may be established. Therefore, as compared with the prior art devices, the number of resistor contacts may be doubled so that the resistance between the adjacent resistor contacts may be reduced. In other words, more fine adjustment of the resistance of the time-constant circuit may becomes possible so that almost continuously variable shutter speeds may be obtained. Therefore, the exposure control may be accomplished with a higher degree of accuracy, and the shutter speed may be more clearly indicated.

What is claimed is:

1. An exposure control device for a camera of the type including a shutter release mechanism comprising
   a. an electric circuit including a photoelectric element and switch means
   b. a base plate provided with an arcuate slot,
   c. an exposure meter mounted on said base plate and connected in said electric circuit whereby said meter is actuable in response to the variation in resistance of said photoelectric element,
   d. a pointer of said exposure meter being adapted to swing above said base plate, said pointer having the leading end thereof being so bent as to extend upwardly through said arcuate slot from an undersurface of said base plate, and having an indicating pointer which is extended in the axial direction of said first mentioned pointer for indication of an exposure condition,
   e. a detecting lever mounted to slide toward the leading end of said pointer above said base plate in response to operation of said shutter release mechanism in such a manner that when the brightness of a subject is sufficient said detecting lever engages with said leading end of said pointer and is stopped thereby and when the brightness of a subject is not sufficient, said detecting lever is further displaced to a full stroke displacement to control said switch,
   f. a pointer retaining plate provided with means for pressing said pointer to retain it in a position to which said pointer swings, and means responsive to the position of said pointer for setting the exposure conditions in said camera, and
   g. means in said circuit responsive to the control of said switch means for switching an exposure condition in said camera.

2. An exposure control device as set forth in claim 1 wherein said exposure setting means comprises
   a. a cam formed on the surface of said retaining plate which makes contact with said pointer,
   b. a stop interlocking lever coupled to the retaining plate to have a position determined in response to the position of said retaining plate, and
   c. stop diaphragms actuable in response to said interlocking lever to set a stop.

3. An exposure control device as set forth in claim 1 wherein said exposure setting means comprises
   a. a movable contact fixed to said pointer,
   b. a meter scale plate and a plurality of stationary contacts for contact with said movable contact disposed upon said meter scale plate,
   c. a plurality of resistors each of which is interconnected between the adjacent contacts of said stationary contacts,
   d. capacitors which constitute time-constant circuits, and
   e. a shutter mechanism actuating a switching circuit responsive to the time-constant of said time-constant circuit.

4. An exposure control device as set forth in claim 1 wherein said means for switching said exposure condition comprises at least
   a. a variable resistor and a switch for selectively connecting either said photoelectric element or said variable resistor to said meter,
   b. a circuit for triggering a flash cube including a switch for closing the triggering circuit, both of said switches being actuable in response to said further displacement of said detecting lever.

5. An exposure control device as set forth in claim 3 wherein said means for switching said exposure condition comprises
   a. a by-pass circuit for said exposure meter and a first switch connected to open and close said by-pass circuit
   b. a second switch connected to be actuated simultaneously with said first switch to vary the capacitance of said capacitors in said time constant circuit, thereby varying the time constant of said time constant circuit, both of said first and second switches being actuable in response to the full stroke displacement of said detecting lever.

6. An exposure control device as set forth in claim 1 comprising a scale plate having two scale ranges and means for selectively displaying said exposure condition on said scale plate in either of said two ranges.

7. An exposure control device as set forth in claim 6 comprising means for displacing said scale plate in response to said full stroke displacement of said detecting lever.

8. In an EE camera having a built-in flash cube, and a shutter release mechanism, an exposure control device comprising an exposure meter having a pointer with a portion adjacent to its free end bent in the form of a U, a detecting lever positioned to be displaced toward the free end of said pointer in response to operation of said shutter mechanism, switching means positioned to be actuable in response to the displacement of said detecting lever, an electric circuit including a variable resistor and an EE photoelectric element, said switch means being connected to substitute said resistor for said element, said circuit being connected to said exposure meter, said resistor having a resistance depending upon a guide number of the flash cube and a film-to-subject distance, a flash cube triggering circuit connected to be energized when said switch means is closed, a rotatable cam plate positioned to press down said pointer in response to operation of said shutter release mechanism after said detecting lever has been actuated, thereby moving said leading end of said pointer away from the path of said detecting lever, the detecting arm of said detecting lever being mounted to engage the free end of said pointer when the brightness of a subject is within the EE range, so that the movement of said detecting lever is limited and said switch means are held in inoperative positions, said detecting arm of said detecting lever being positioned so that it cannot engage said free end of said pointer when the brightness of a subject is so dark as to be out of an EE range so that said detecting lever may displace a greater stroke beyond the path of said free end of said pointer, thereby permitting the movement thereof to actuate said switch means to substitute said variable resistor for said EE photoelectric element so as to cause said pointer through an angle which is determined depending upon the resistance of said variable resistor, and to close said switch means to establish the flash cube triggering circuit, and means for rotating said cam plate to engage said pointer immediately after said trigger circuit has been established thereby setting a stop in said camera, and means for then automatically triggering said flash cube in response to further control of said shutter release mechanism.

9. In a camera of the type having a view finder, a shutter release mechanism and incorporating an electronic shutter circuit in which the resistance of a time constant circuit is varied in response to the angular displacement of a pointer of an exposure control meter, an exposure control device comprising a detecting lever mounted to have a smaller and greater displacement depending upon whether said detecting lever is engageable with the leading end of said pointer or not in response to the operation of said shutter release mechanism, a displaceable scale plate having a high and low shuttr speed scales, and a group of resistors constituting said time constant circuit, a selection switch actuable in response to the displacement of said scale plate to select the range of said time constant circuit, a pointer retaining plate mounted to press down said pointer to make it selectively contact one of the resistors in said resistor group, said pointer being positioned to engage said detecting lever when an optimum shutter speed is in a high shutter speed range so that the displacement of said detecting lever is limited and said scale plate is held stationary whereby said high shutter speed scale can be viewed in the field of view of said viewfinder, said pointer being positioned to contact one of a plurality of resistor contacts connected to the junctions of said resistors respectively toward which said pointer is swung when said retaining plate presses down said pointer, thereby establishing a high shutter speed time constant circuit in said electronic shutter circuit, said pointer being positioned so that said detecting lever cannot engage it when an optimum shutter speed is in a low shutter speed range so that the detecting arm of said detecting lever may move beyond the path of said leading end of said pointer, and means for causing the displacement of said scale plate when the lever moves beyond said leading end to permit the low shutter speed scale to be viewed in the field of view of said viewfinder and to cause said selection switch to select a low shutter speed range to actuate said exposure control meter again, and means for thereafter moving said retaining plate to cause said pointer to make contact one of said resistor contacts, thereby establishing a low shutter speed time constant circuit in said electronic shutter circuit.

10. An exposure control device for a camera of the type having a exposure meter mounted on a plate and having a pointer positioned to move in a plane above said plate, and wherein the camera further includes shutter release means and exposure condition setting means, the improvement wherein said plate has a slot, said pointer having an extension bent so that said extension extends downwardly from said pointer and has a leading edge extending upwardly through said slot for meeting said plate, said extension further having an indicating pointer for indicating an exposure condition corresponding to the brightness of a scene, said indicating pointer extending substantially in a longitudinal direction of said first mentioned pointer, said control device further comprising:
   a. a slidable detecting lever having a leading edge positioned to engage said leading end in a first given range of angular positions of said pointer corresponding to adequate brightness for operation of the camera with a given exposure setting, and to miss said leading end at another angular position of said pointer corresponding to inadequate brightness to operate the camera at said given exposure setting, upon movement of said lever in one direction, b. means responsive to operation of said shutter release means for moving said lever in said one direction, whereby said lever is stopped by said leading end at a first position when said brightness is adequate to operate the camera and is permitted to move to a second position when said brightness is inadequate to operate the camera,
c. a pointer retaining plate and means responsive to operation of said shutter release means for urging said pointer retaining plate against said pointer for holding said pointer against further movement, and
d. an electric circuit including a photo cell connected to said exposure meter, said circuit including switch means operable by said lever in said second position to change a parameter of said electric circuit, whereby when said switch means is operated the response of said exposure meter is varied.

11. The exposure meter of claim 10 for use in a camera system including flash means, wherein said electric circuit comprises resistor means, and said switch means comprises means for substituting said resistor means for said photoelectric cell in said circuit in said second position of said detecting lever, said resistor means having a resistance corresponding to the guide number of the flash means and a film-to-subject distance.

12. The exposure meter of claim 11 in which said exposure condition setting means is a diaphragm setting means, wherein said pointer retaining plate comprises a stepped lever having a displacement dependent upon the position of said pointer, comprising means coupling said lever to said diaphragm setting means.

13. The exposure meter of claim 10 in which said exposure condition setting means is a shutter control means, wherein said electric circuit comprises means for operating said shutter control means, time constant circuit means, and means responsive to operation of said switch means for changing a time constant in the time constant circuit means for controlling the time of operation of said shutter control means.

14. The exposure meter of claim 13 wherein said time constant means comprises a plurality of speed electric contacts interconnected by resistor means, said contacts being positioned to be selectively electrically connected to said pointer when said pointer is urged by said pointer retaining plate.

* * * * *